(12) United States Patent
Cheng

(10) Patent No.: US 7,378,018 B2
(45) Date of Patent: May 27, 2008

(54) INTERSECTING WATER CONDUCTING FILTER

(76) Inventor: Shih Cheng, No. 25, Chang-Hsing St., Nan-Tzu District, Kaohsiung (TW) 811

( * ) Notice: Subject to any disclaimer, the term of this patent is extended or adjusted under 35 U.S.C. 154(b) by 0 days.

(21) Appl. No.: 11/138,371

(22) Filed: May 27, 2005

(65) Prior Publication Data
US 2006/0266691 A1 Nov. 30, 2006

(51) Int. Cl.
*B01D 24/00* (2006.01)
*B01D 27/02* (2006.01)
(52) U.S. Cl. ............... 210/266; 210/282; 210/283; 210/287; 210/449
(58) Field of Classification Search ............... 210/266, 210/282, 283, 287, 449
See application file for complete search history.

(56) References Cited
U.S. PATENT DOCUMENTS

| | | | | |
|---|---|---|---|---|
| 2,328,381 A | * | 8/1943 | Jaffe | 285/8 |
| 5,205,932 A | * | 4/1993 | Solomon et al. | 210/264 |
| 5,914,043 A | * | 6/1999 | Farley | 210/668 |
| 6,887,379 B2 | * | 5/2005 | Schiltz | 210/266 |
| 2002/0179535 A1 | * | 12/2002 | Lutich | 210/688 |

* cited by examiner

*Primary Examiner*—Duane Smith
(74) *Attorney, Agent, or Firm*—Troxell Law Office, PLLC

(57) ABSTRACT

An intersecting water conducting filter including a filter main body. An oblique tapered assembly chamber is formed in the filter main body. A sidewall of the assembly chamber is formed with multiple insertion grooves in each of which a water conducting layer is inlaid. Each water conducting layer is composed of a partitioning board and a filtering cotton. The partitioning board of each water conducting layer is formed with one or more conducting holes at different intervals. When water flows through the conducting holes, an intersecting conducting effect is provided for the water flow so that the water can fully flow through the Far-infrared precision ceramic/porcelain particle layer, KDF copper/zinc filtering layer, calcium sulfite layer and coconut shell activated carbon layer installed between the water conducting layers. The filter main body has a first end formed with inner thread for connecting with a shower sprinkler, an intake controller or a water inlet end. A second end of the filter main body is formed with outer thread for connecting with an outlet conduit.

6 Claims, 7 Drawing Sheets

INTERSECTING WATER CONDUCTING FILTER

BACKGROUND OF THE INVENTION

The present invention is related to an intersecting water conducting filter which is applicable to a kitchen, a shower sprinkler, an RO water purifier and an aquarium. The filter is also outdoors usable in a trip.

There are various commercially available water filters. The conventional water filter has single usage. For example, the filter of an RO water purifier can be only mounted in the RO water purifier and cannot be used as a water filter for an aquarium, and vice versa. As a result, too many types of filters have been developed. In order to filter water, each equipment necessitates a filter. This increases the expense of a purchaser. Moreover, a user can hardly DIY install the water filter in a kitchen or a bathroom. Also, the conventional water filter is not portable for outdoor use.

SUMMARY OF THE INVENTION

It is therefore a primary object of the present invention to provide an intersecting water conducting filter in which multiple water conducting layers are mounted. Each water conducting layer is composed of a partitioning board and a filtering cotton. The partitioning board is formed with several conducting holes at different intervals. When water flows through the conducting holes, an intersecting conducting effect is provided for the water flow. The intersecting water conducting filter which is applicable to a kitchen, a shower sprinkler, an RO water purifier and an aquarium. The filter is also outdoors usable in a trip.

The present invention can be best understood through the following description and accompanying drawings wherein:

BRIEF DESCRIPTION OF THE DRAWINGS

FIGS. 3-3D shows the structures of the partitioning boards of the present invention;

DETAILED DESCRIPTION OF THE PREFERRED EMBODIMENTS

Figure 1:
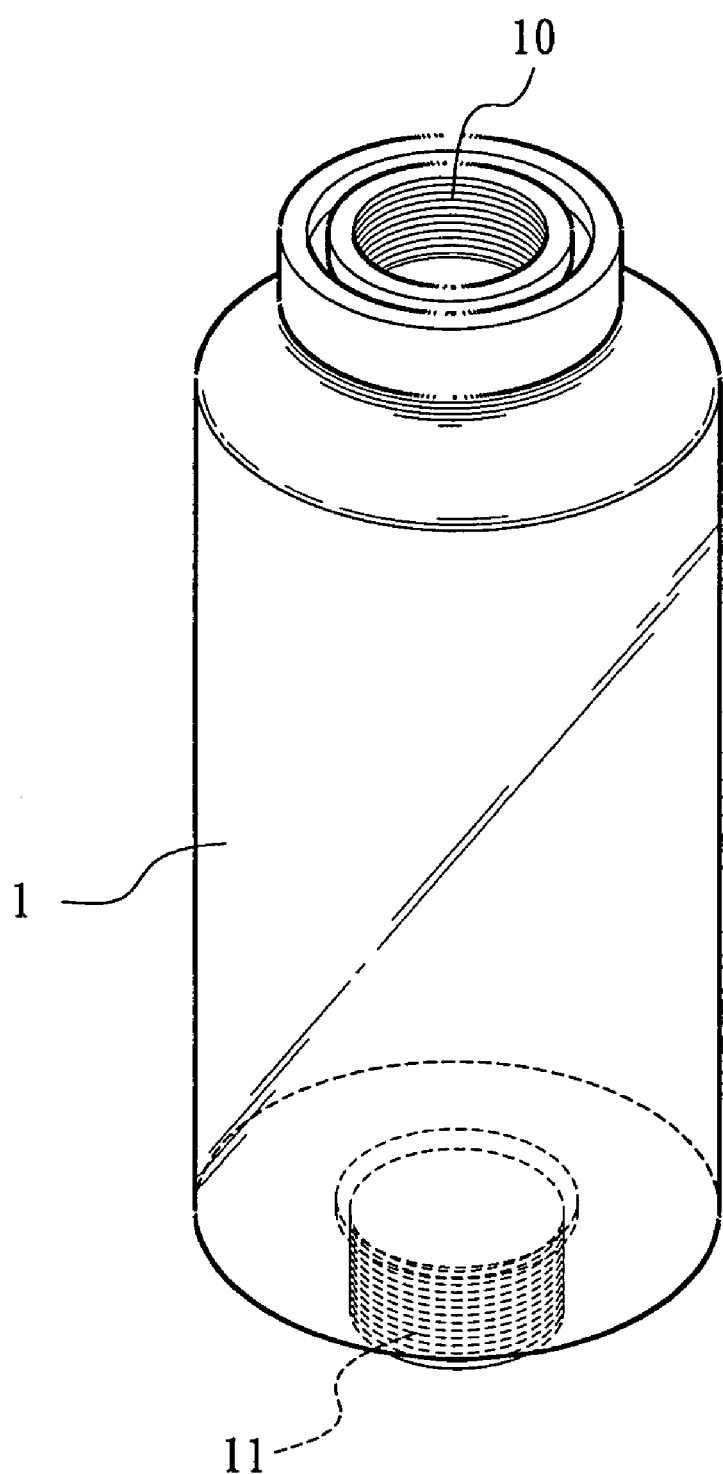
FIG. 1 is a perspective view of the filter main body of the present invention.
Figure 2:
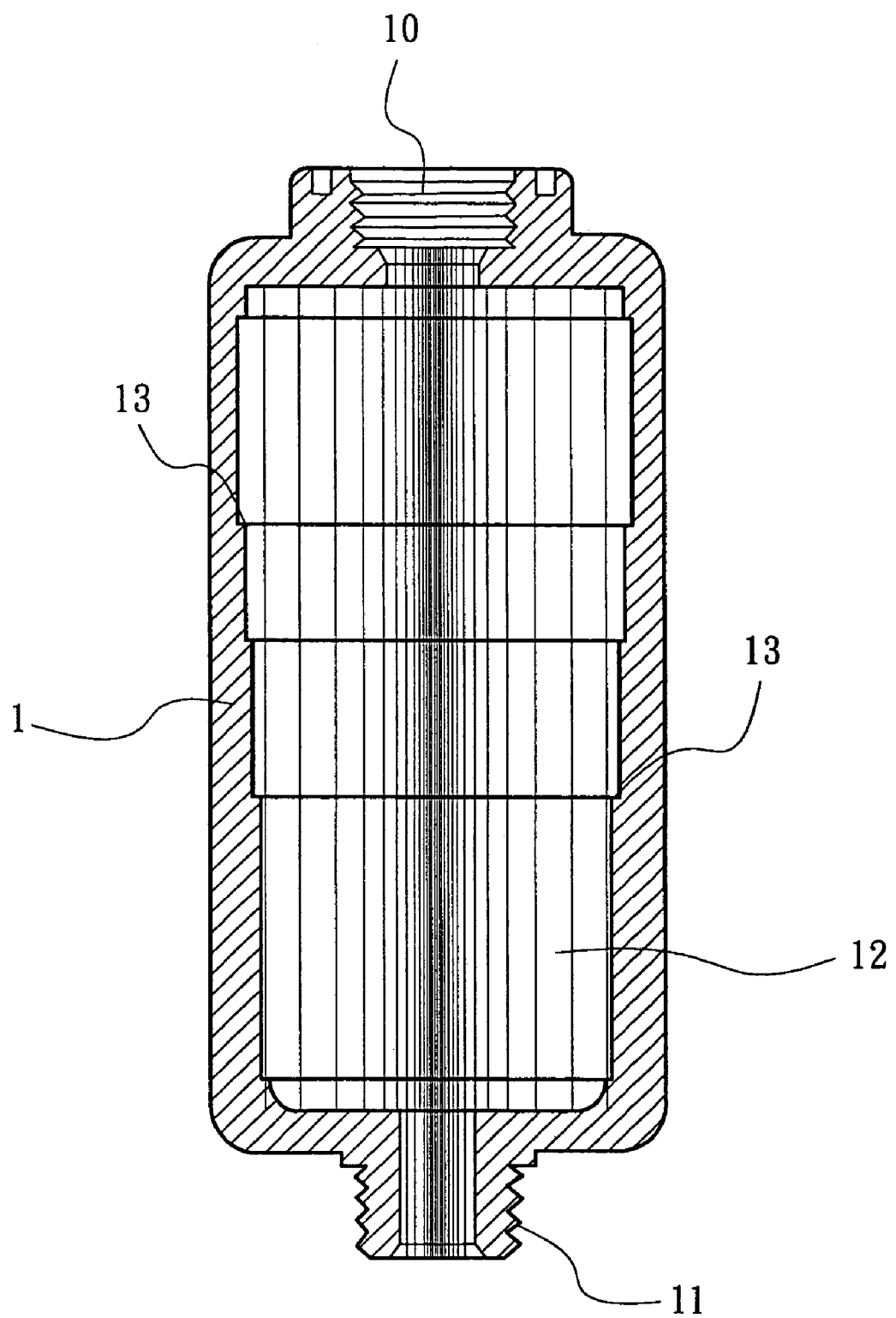
FIG. 2 is a sectional view of the filter main body of the present invention.
Figure 3:
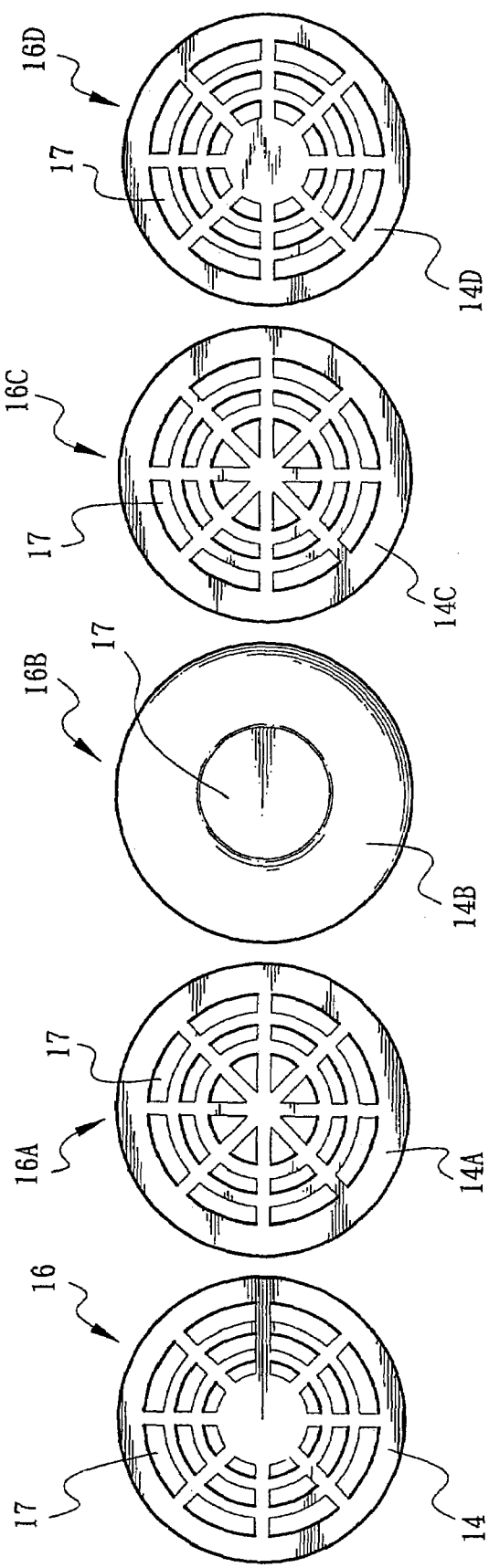
Figure 4:
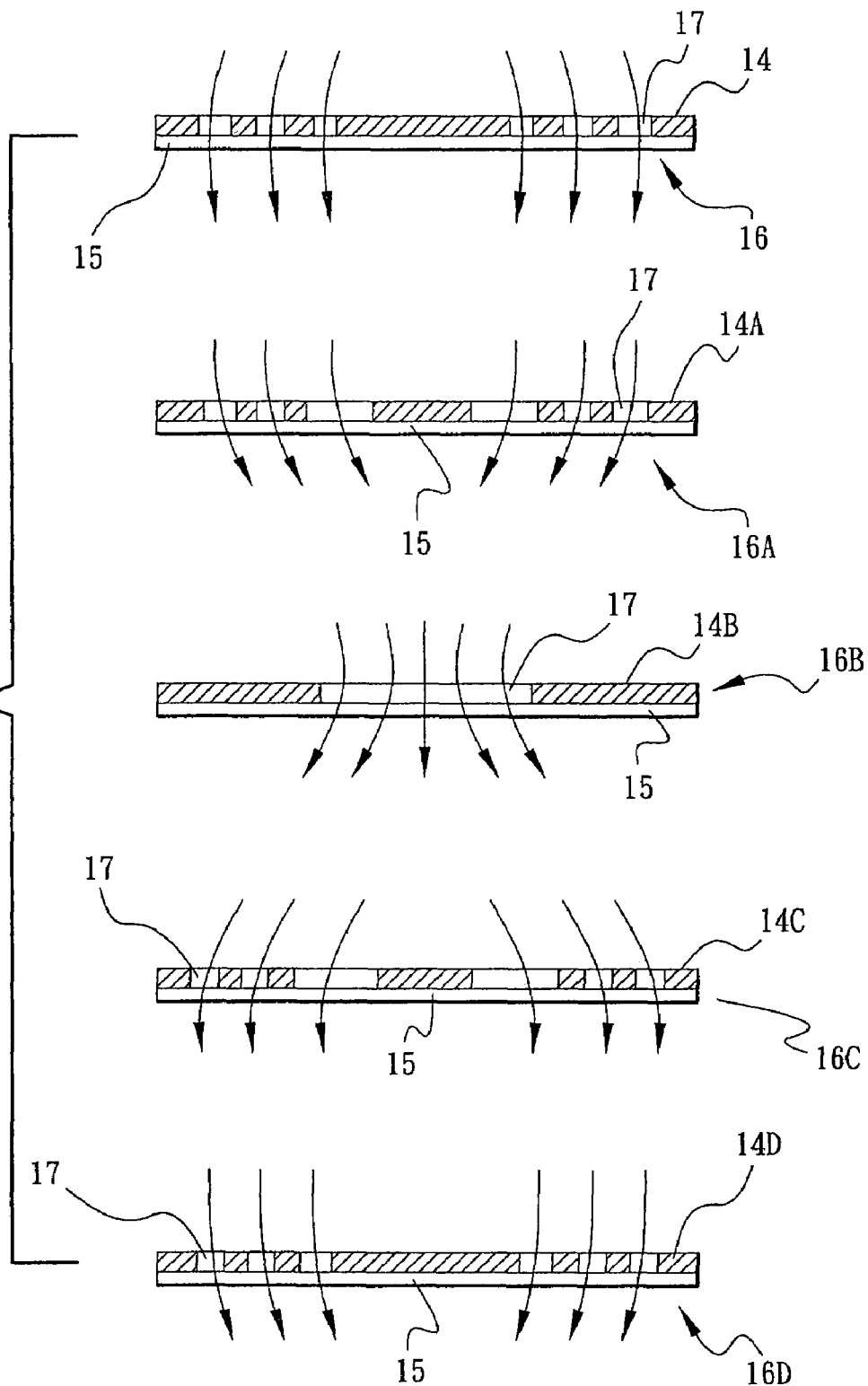
FIG. 4 is a schematic sectional view of the water conducting layers of the present invention.
Figure 5:
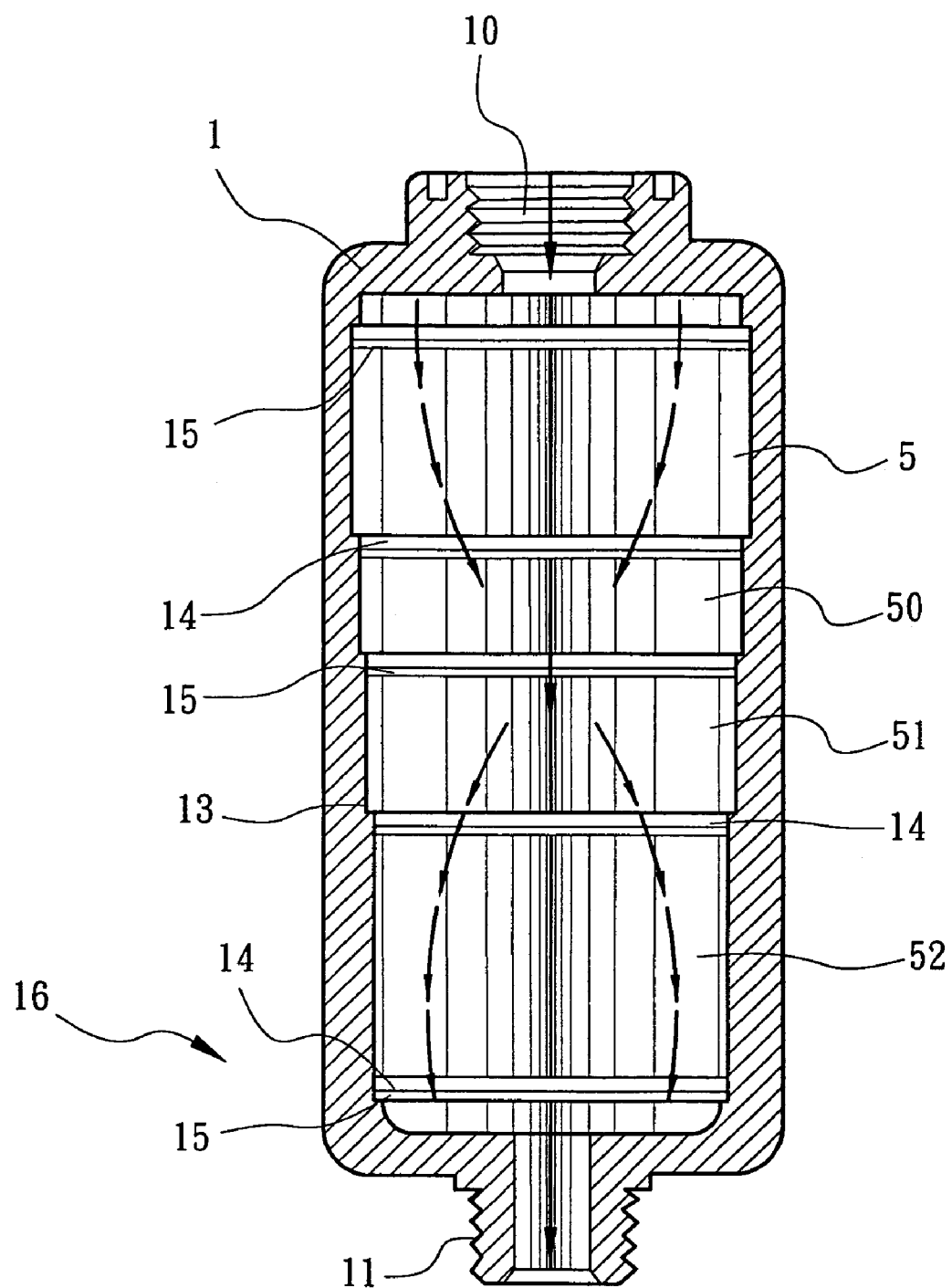
FIG. 5 is a sectional view showing the intersecting water conducting operation of the present invention.

Please refer to FIGS. 1 to 5. The filter main body 1 of the present invention has a first end formed with inner thread 10 for connecting with a shower sprinkler, an intake controller 3 or a water inlet end. A second end of the filter main body 1 is formed with outer thread 11 for connecting with an outlet conduit 4. An oblique tapered assembly chamber 12 is formed in the filter main body 1. A sidewall of the assembly chamber 12 is formed with multiple insertion grooves 13 in each of which a water conducting layer 16A, 16B, 16C and 16D is inlaid. The water conducting layer 16A, 16B, 16C and 16D are respectively composed of a partitioning board 14A, 14B, 14C, 14D and a filtering cotton 15. Far-infrared precision ceramic/porcelain particle layer 5, KDF copper/zinc filtering layer 50, calcium sulfite layer 51 and coconut shell activated carbon layer 52 are sequentially installed between the water conducting layers 16A, 16B, 16C and 16D. The partitioning board 14A, 14B, 14C, 14D of each water conducting layer 16A, 16B, 16C and 16D is formed with several conducting holes 17 at different intervals. When water flows through the conducting holes 17, an intersecting conducting effect is provided for the water flow.

Figure 6:
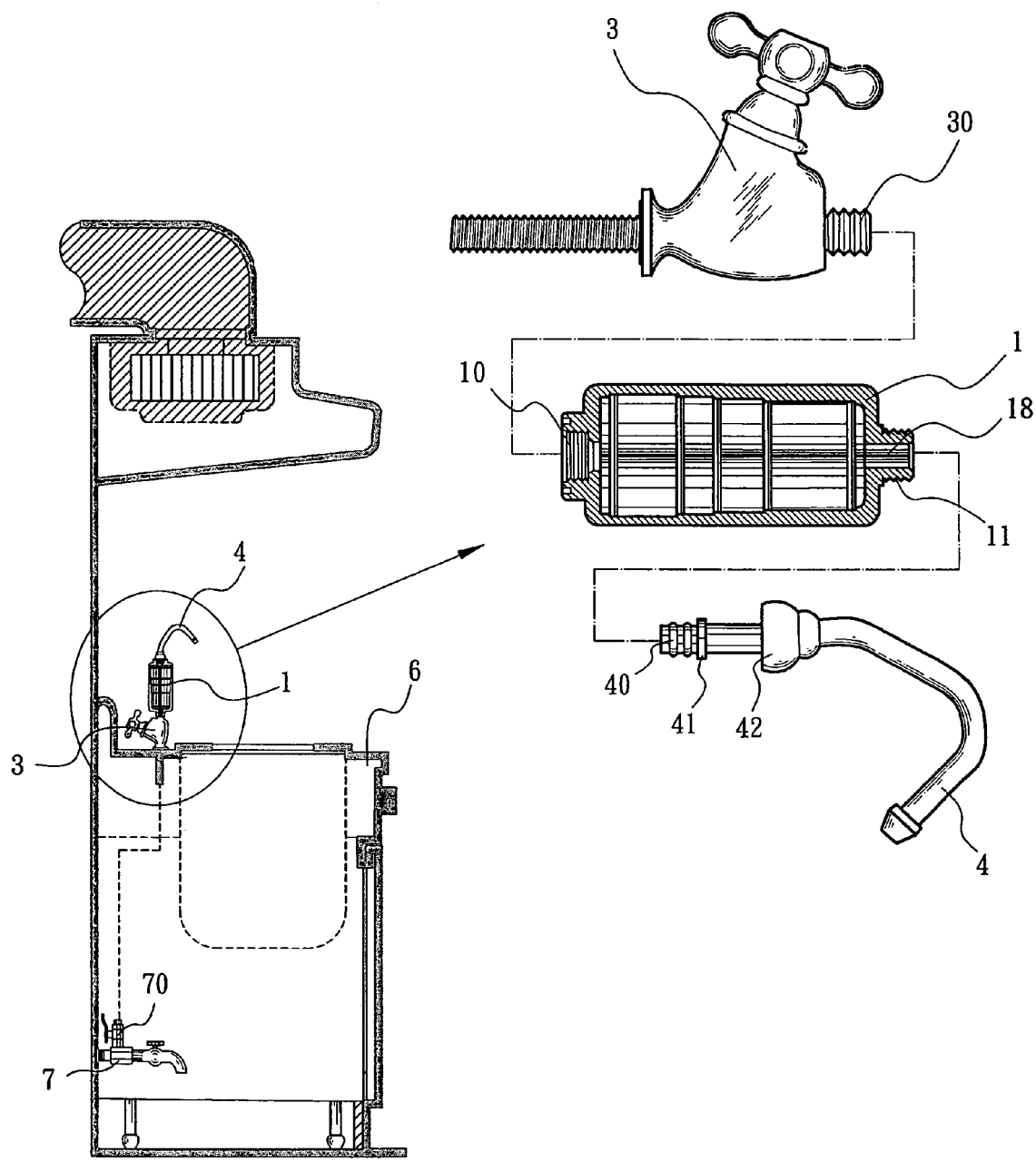
FIG. 6 shows that the present invention is applied to a kitchen.

Referring to FIG. 6, the second end of the filter main body 1 is formed with a socket 18. A head end of the outlet conduit 4 is equipped with washers 40. The head end of the outlet conduit 4 is inserted into the socket 18. Then a fixing collar 42 is screwed onto the outer thread 11 so as to firmly connect the outlet conduit 4 with the filter main body 1. The intake controller 3 has a threaded end 30 screwed into the inner thread 10 of the first end of the filter main body 1 so as to firmly connect the intake controller 3 with the filter main body 1. A tail section of the intake controller 3 is passed through a kitchen cabinet 6 and connected with a water outlet 70 of an intake three-way pipe 7. Accordingly, the tap water can flow through the intake three-way pipe 7, the water outlet 70, the intake controller 3 and the filter main body 1 and flow out from the outlet conduit 4. Therefore, a user can achieve better water quality in the kitchen.

Figure 7:
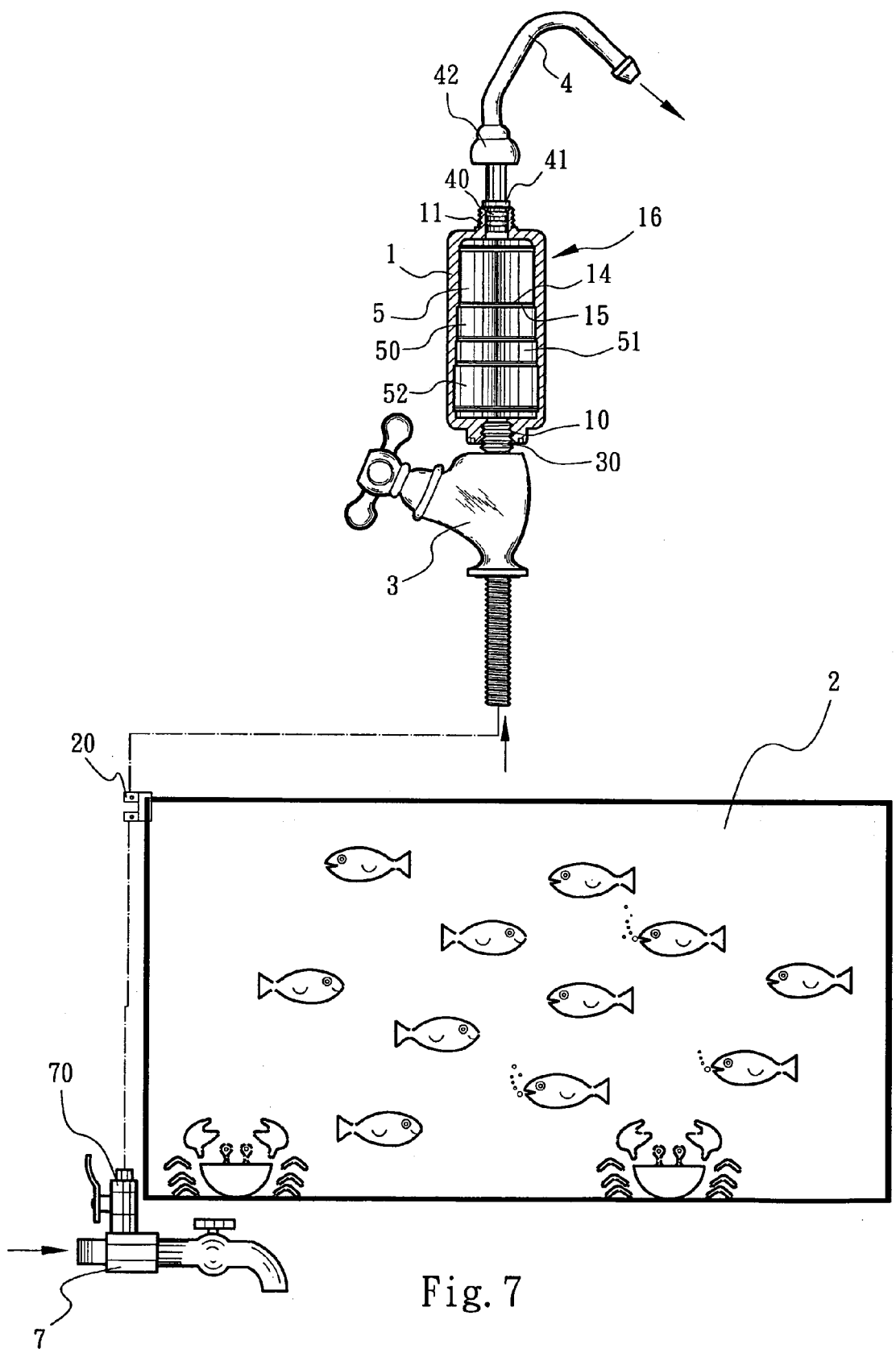
FIG. 7 shows that the present invention is applied to an aquarium.

Alternatively, as shown in FIG. 7, the head end of the outlet conduit 4 is inserted into the socket 18. Then the fixing collar 42 is screwed onto the outer thread 11 so as to firmly connect the outlet conduit 4 with the filter main body 1. The threaded end 30 of the intake controller 3 is screwed into the inner thread 10 of the first end of the filter main body 1 so as to firmly connect the intake controller 3 with the filter main body 1. The tail section of the intake controller 3 is clamped with a clamp 20 of an aquarium 2 and connected with the water outlet 70 of the intake three-way pipe 7. Accordingly, the tap water can flow through the intake three-way pipe 7, the water outlet 70, the intake controller 3 and the filter main body 1 and flow out from the outlet conduit 4. Therefore, a better water quality can be provided for the aquarium.

Still alternatively, the inner thread 10 of the filter main body 1 can be screwed with an inlet end of a faucet. When the faucet is opened, the tap water can flow through the filter main body 1 to achieve optimal water quality. The water then flows through the outlet conduit 4 and flows out from a shower sprinkler for a bath.

Still alternatively, the outer thread 11 of the filter main body 1 can be connected with the inlet end of a faucet via a conduit. The inner thread 10 of the filter main body 1 can be screwed with the thread of a shower sprinkler to integrally connect the shower sprinkler with the filter main body 1. When the faucet is opened, the tap water can flow through the filter main body 1 to achieve optimal water quality. The water is then sprinkled out from the shower sprinkler. During a trip, a user can carry the filter main body 1 for outdoor use.

Still alternatively, the head end of the outlet conduit 4 is inserted into the socket 18 of the filter main body 1. Then the fixing collar 42 is screwed onto the outer thread 11 so as to firmly connect the outlet conduit 4 with the filter main body 1. Hollow filament membrane, alkaline ceramic/porcelain, antibacterial alkaline ceramic/porcelain ball, far-infrared ceramic/porcelain, activated carbon, zeolite, resin, antibacterial silver activated carbon, manganese sand, quartz sand, diatomaceous ceramic/porcelain particles and PP cotton can be mounted in the assembly chamber 12 of the filter main body 1 for filtering the water. The threaded end 30 of the intake controller 3 is screwed into the inner thread 10 of the first end of the filter main body 1 so as to firmly connect the intake controller 3 with the filter main body 1. The tail section of the intake controller 3 is connected with an RO water purifier for achieving optimal water quality.

Still alternatively, the head end of the outlet conduit 4 is inserted into the socket 18 of the filter main body 1. Then the fixing collar 42 is screwed onto the outer thread 11 so as to firmly connect the outlet conduit 4 with the filter main body 1. Water is output from a faucet switcher into the filter main body 1 and then flows out from the outlet conduit 4. The filter main body 1 can be mounted in a kitchen to achieve optimal water quality.

The hollow filament membrane is made by fiber technique. The hollow filament membrane has a capillary structure including outer wall layer, middle wall layer and inner wall layer. Each wall layer has numerous micro-filtering pores for thoroughly continuously filtering off bacteria such as coliform and dysenteric bacteria. Also, the rust of the water pipe can be filtered off.

The far-infrared precision ceramic/porcelain particle layer 5 is composed of far-infrared elements refined from many kinds of minerals capable of releasing physical rays. The far-infrared precision ceramic/porcelain particle layer 5 is able to quickly oscillate the molecules to covibrate for bonding with water and quickly cutting water molecules. Accordingly, the water molecular group will be minified to enhance the oxygen content. The water molecules will have stronger activity to form fined activated water for enhancing metabolism and activating cells.

The KDF copper/zinc filtering layer 50 has a dechlorination capacity six times the activated carbon. In addition, the KDF copper/zinc filtering layer 50 is able to remove water-soluble heavy metals such as lead, iron, cadmium, aluminum and arsenic and other inorganic materials. Also, the KDF copper/zinc filtering layer 50 can be backwashed and repeatedly used. Moreover, the KDF copper/zinc filtering layer 50 can effectively restrain growth of bacteria and alga and reduce calcium and magnesium ions. Furthermore, the KDF copper/zinc filtering layer 50 can regulate pH value to prolong using life of the pretreatment filtering material of the RO and DI system.

The calcium sulfite layer 51 of the present invention serves to remove the chlorine and trihalomethane remaining in the tap water so as to avoid cancer.

The coconut shell activated carbon layer 52 of the present invention is composed of coconut shell-shaped activated carbon particles with best deodorization capability. The surface of the coconut shell activated carbon layer 52 has numerous fissures and fine pores for attracting the odor of bleaching water, the chloride and the organic compounds. Therefore, the odors and impurities entrained by the tap water can be totally removed. In addition, the coconut shell activated carbon layer 52 is able to restrain reproduction of bacteria.

According to the above arrangement, one end of the filter main body 1 of the present invention can be connected with the outlet conduct 4 and the other end of the filter main body 1 can be connected with the shower sprinkler, intake controller 3 or water inlet end. Accordingly, the water will pass through every water conducting layers 16 inside the filter main body 1 to provide an intersecting water conducting effect. Various filtering layers can be mounted in the filter main body 1 for kitchen use, shower use, travel use, RO water purifier use and aquarium use. Therefore, the application range of the present invention is widened.

The above embodiments are only used to illustrate the present invention, not intended to limit the scope thereof. Many modifications of the above embodiments can be made without departing from the spirit of the present invention.

What is claimed is:

1. An intersecting water conducting filter comprising:
    a) a filter main body having:
        i) an inner thread located on a first end thereof;
        ii) an outer thread located on a second end thereof; and
        iii) an oblique tapered assembly chamber having a plurality of insertion grooves located in a peripheral sidewall thereof;
    b) a plurality of water conducting layers, each of the plurality of water conducting layers has a partition board having at least one conduction hole and a filtering cotton layer, one of the plurality of water conducting layers is located in each of the plurality of insertion grooves, the at least one conduction hole of the plurality of water conducting layers is alternatingly spaced creating an intersecting conducting effect; and
    c) a plurality of intermediate layers comprising a far-infrared precision ceramic/porcelain particle layer, KDF copper/zinc filtering layer, a calcium sulfite layer, and a coconut shell activated carbon layer, located between each of the plurality of water conducting layers.

2. The intersecting water conducting filter according to claim 1, wherein a center water conducting layer of the plurality of water conducting layers has a conduction hole located in a center thereof.

3. The intersecting water conducting filter according to claim 2, wherein the plurality of water conducting layers includes a plurality of outer water conducting layers located on opposing sides of the center water conducting layer, each of the plurality of outer water conducting layers has a plurality of outer conduction holes spaced apart from a center thereof.

4. The intersecting water conducting filter according to claim 1, further comprising an outlet conduit having an plurality of washers and a fixing collar, the second end of the filter main body includes a socket, the plurality of washers are located in the socket and the fixing collar is threadedly connected to the outer thread of the filter main body.

5. The intersecting water conducting filter according to claim 1, wherein the oblique tapered assembly chamber includes at least one filtering material selected from a group consisting of hollow filament membrane, alkaline ceramic/porcelain, activated carbon, zeolite, resin, antibacterial silver activated carbon, manganese sand, quartz sand, and diatomaceous ceramic/porcelain.

6. The intersecting water conducting filter according to claim 1, wherein the inner thread of the filter main body is connected to a water supply.

* * * * *